United States Patent
Hauck

(10) Patent No.: US 7,454,263 B2
(45) Date of Patent: Nov. 18, 2008

(54) METHOD AND SYSTEM FOR DETERMINING RESETTING OPERATIONS OF A PRINTING PRESS

(75) Inventor: Dieter Hauck, Eberbach (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 10/897,910

(22) Filed: Jul. 23, 2004

(65) Prior Publication Data

US 2005/0028700 A1 Feb. 10, 2005

(30) Foreign Application Priority Data

Aug. 1, 2003 (DE) ................. 103 35 327

(51) Int. Cl.
 G06F 7/66 (2006.01)
 G06F 19/00 (2006.01)
(52) U.S. Cl. ................. 700/127; 700/117; 700/122
(58) Field of Classification Search ................. 700/117, 700/122, 123, 127, 129
 See application file for complete search history.

(56) References Cited

U.S. PATENT DOCUMENTS

| | | | | |
|---|---|---|---|---|
| 4,639,881 A | * | 1/1987 | Zingher | 715/839 |
| 5,625,758 A | | 4/1997 | Schneider et al. | 395/114 |
| 5,930,468 A | * | 7/1999 | Zingher et al. | 358/1.16 |
| 6,006,662 A | | 12/1999 | Ishida et al. | 101/141 |
| 6,230,622 B1 | | 5/2001 | Dilling | 101/484 |
| 6,373,584 B1 | * | 4/2002 | Barney et al. | 358/1.15 |
| 6,546,364 B1 | * | 4/2003 | Smirnov et al. | 703/22 |
| 2002/0096077 A1 | * | 7/2002 | Frankenberger | 101/484 |
| 2004/0196493 A1 | * | 10/2004 | Christiansen et al. | 358/1.15 |

FOREIGN PATENT DOCUMENTS

| | | |
|---|---|---|
| DE | 43 28 026 | 3/1995 |
| DE | 196 31 469 | 2/1998 |
| DE | 197 15 099 | 10/1998 |
| DE | 199 10 243 | 9/1999 |
| DE | 694 16 480 | 9/1999 |
| DE | 198 22 662 | 11/1999 |
| DE | 199 35 318 | 2/2001 |
| DE | 698 04 390 | 12/2002 |
| EP | 0649 744 | 2/1999 |
| EP | 0 897 799 | 3/2002 |

\* cited by examiner

*Primary Examiner*—Ryan A Jarrett
(74) *Attorney, Agent, or Firm*—Davidson, Davidson & Kappel, LLC

(57) ABSTRACT

A method for operating a machine (10) in the graphics industry using a computer (4), at least one job, which is processed on the machine (10), being storable in the computer (4). The method is distinguished in that the computer (4) includes a control device which determines the properties of the stored job; the control device sets up the machine (10) in accordance with the ascertained properties; and, to process the job, the control device computes necessary further data from the existing data and subsequently processes the job. Also a device for carrying out the method.

24 Claims, 2 Drawing Sheets

METHOD AND SYSTEM FOR DETERMINING RESETTING OPERATIONS OF A PRINTING PRESS

This application claims priority to German Patent Application 103 35 327.5, filed 1 Aug. 2003, which is hereby incorporated by reference herein.

BACKGROUND

The present invention is directed to a method for operating a machine in the graphics industry using a computer.

According to the current state of technological development, machines in the graphics industry work in accordance with a defined operating scheme, so that for every print job, certain adjustments or inputs are required by an operator of the machine. This applies to all machines in the graphics industry, such as computer-to-plate image setters and raster-image processors in the pre-press stage, printing presses, folding machines, and packaging machines, as well as to other post press operations for printed products. Each print job normally passes through three stations: pre-press, press, and post press. In the process, the print job is either described in a conventional job docket or it is routed as an electronic file, as a type of virtual job docket, through each of the processing stations. Depending on the print job, the operator must then make the necessary adjustments or enter the requisite settings for the print job at each of the machines, and if necessary, after producing a specimen print, correct these adjustments, so that the printed product ultimately corresponds to the printing copy preselected by the customer.

This procedure is rather time-consuming and necessitates an in-depth understanding of printing technology on the part of the operator, since the operator must select characteristics for the inking system of a printing press and make further adjustments. In particular, the numerous settings of a printing press overtax personnel who have not been trained as printers. In the graphics industry, the time factor also plays a role that cannot be underestimated, so that time-consuming resetting operations between two print jobs, as are typically required for the most part at the present time, represent a considerable disadvantage with respect to the economic efficiency of the machines that are used.

It is known from other sectors of industry to further automate the control of production processes. A method from this area of automation engineering is known from the German Application no. DE 199 35 318 A1. The application describes the automation of a manufacturing system using a plurality of machines which process work pieces. The machines are assigned individual machine controls, which are also provided with so-called operational control agents for transmitting appropriate control commands to the machine controls. In this context, a generally known operator interface, such as a keyboard and a monitor, is simulated by software, and instead of input signals being transmitted by an operator, the signals are relayed by the operational control agents to the machine control. In accordance with the description of the application, each workpiece to be processed is overseen by a so-called workpiece agent, which has stored the individual production processes used in the processing of the particular workpiece, and which supervises the work pieces. The workpiece agent then makes sure that the appropriate processing operations are carried out at the processing stations in question. To that end, the workpiece agents communicate with the particular machine agents, so that there is no need for the operator to intervene, and the production system is run as an automated system.

However, the usefulness of a machine agent or workpiece agent, as described in the application discussed above, is not immediately evident for machines used in the graphics industry. The greatest distinction is that it is, in fact, typical of print jobs in the graphics industry for the most important job data to be described or stored in a job docket. However, additional data still need to be input by the operator into the control computer of a printing press. These additional data are often input by the operator typically on the basis of the experience of the operator.

SUMMARY OF THE INVENTION

The present invention provides a method to automate the processing of jobs in the graphics industry to the greatest extent possible and to enable machines used in the graphics industry to be operated to the greatest extent possible by operation personnel having a minimal level of experience and knowledge of printing technology.

In one preferred embodiment of the present invention, a method for operating a graphics machine using a computer is provided. At least one job, which is processed on the machine, is storable in the computer. The computer includes a control device, which determines the properties of the stored job; the control device sets up the machine in accordance with the ascertained properties; and, to process the job, the control device computes necessary further data from the existing data and subsequently processes the job.

In another embodiment of the present invention, a computer is arranged and configured to control and operate a graphics machine according to the steps of the method discussed above.

DETAILED DESCRIPTION

The method according to the present invention is preferably implemented as a software module, running either on a control computer of a machine to be used in the graphics industry or on a separate PC or laptop, which is able to communicate with the machine. The computer on which the software module according to the present invention runs may then relieve the operator of all adjustment processes that the operator is able to calculate from available job data or that the operator, by acting on his own, is able to supplement with empirical values from preceding jobs. The software module, according to the present invention, forms a control device in the computer, which, once the machine starts up, automatically loads data relating to pending jobs into the main memory of the computer, determines the properties of stored jobs, and then sets up the machine in accordance with ascertained properties. In the process, the control device sets up printing presses and also controls processing operations on other participating machines, such as, for example, computer-to-plate image setters, raster-image processors or folding machines.

For this purpose, however, the control device not only accesses the data pertaining to the current print job, but also computes other data relevant to properties of the print job, which are necessary for setting up and processing the print job. In addition, for such computations, data is stored in the memory of the computer relating to similar print jobs completed in the past, and further relating to the history of the machine being controlled by the computer. These data are consulted by the computer while formulating the calculations. For example, recurring deviations are able to be determined from the stored machine history, and these are included at the same time in the computations and, thus, considered when setting up a new print job. Once the necessary adjustments are made, the control device ensures that the print job is also automatically processed on the machine. From this, it is apparent that, on the basis of the present invention, the operator actually only needs to intervene in the case of an emergency or unforeseeable events, and his work is thus substantially facilitated.

Figure 1:
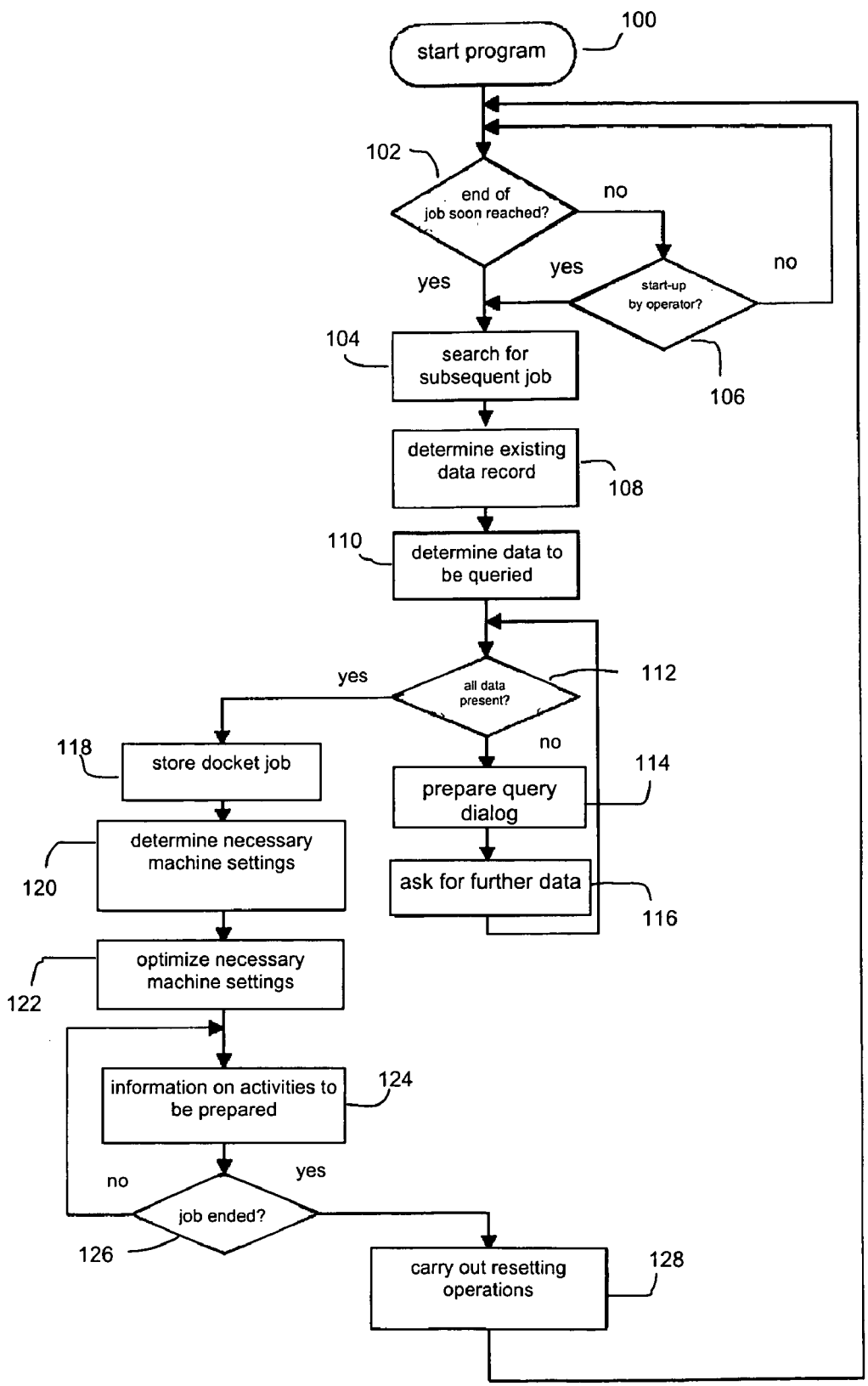
FIG. 1 is a flow chart illustrating a method according to the present invention, during a job change.
Figure 2:
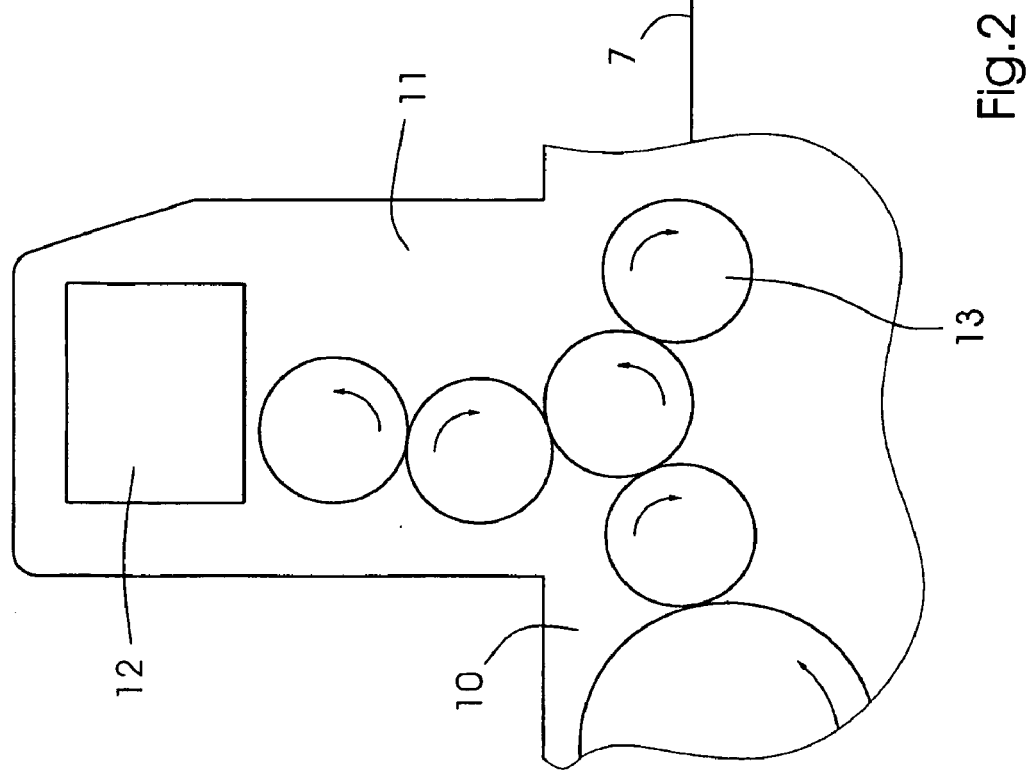
FIG. 2 is a schematic illustration of a printing press having a control console for implementing a method for controlling the printing press, according to the present invention.

Referring now to the drawings, and initially to FIG. 1, there is shown a flow chart illustrating a method according to the present invention, during a job change. The flow chart illustrated in FIG. 1 illustrates the sequences of operations when the transition is made from one print job to a next print job, the subsequent processing of this next print job, and the transition to another third print job, as well as the resetting operations resulting from the transition to this third print job. The sequences depicted in the flow chart of FIG. 1 are an example of an automated operation of a printing press 10 in accordance with the present invention, in conjunction with a computer 4, which are shown in FIG. 2. Such an automated operation is not only feasible for the printing press 10 shown here, but also for computer-to-plate image setters and raster-image processors in the pre-press stage, as well as for folding machines and packaging machines used in post press processing.

As shown in FIG. 2, an offset sheet-fed press 10 comprises at least one print unit 11, which comprises, in turn, of a plurality of printing and transport cylinders 13, as well as of an inking system 12. In such a print unit 11, printing substrates in sheet form are processed, which, in the context of multi-color printing, must still run through other print units 11 not shown in FIG. 2. A control computer 4 of printing press 10 communicates via a communications connection 7 with a control device of computer 4 at a control console 6. The control console 6 is typically set up in the vicinity of the printing press 10. It facilitates the start-up operation, as well as the control of the settings required during, prior to, and subsequently to the printing of sheets. The control device of computer 4 comprises a software module that runs on a commercial PC utilizing, for example, a windows operating system. Inputs may be communicated by operating personnel to the control device via an operator's control screen 2, designed as a so-called touch screen. This means that operating personnel may adjust or enter settings and initiate functions on screen 2 simply by touching the same.

Moreover, as further illustrated in FIG. 2, the operator's control screen 2 is connected via a hinge-mounted bracket 3 to the control console 6. In addition, mounted above the control console 6 is lighting 5 which illuminates the control console 6 and, in particular, a surface area for examining specimen prints from print runs. Also mounted above operator's control screen 2 is a video camera 1 which may be used to identify the operating personnel. An authorization profile is stored in the control device for each operator who is authorized to operate the printing press 10. Thus, each operator is allowed a different sphere of functions on the operator's control screen 2. In addition to the video camera 1, an identification sensor 8 is mounted on the computer 4 to assist in identifying the operating personnel. For example, the identification device 8 may read out data from an operator's machine-readable identification card and, in this way, identify the operating personnel. The identification sensor 8 may undertake the identification process in addition to or as the sole alternative to video camera 1.

However, in accordance with the present invention, it is only necessary for the operating personnel, via operator's control screen 2, to enter those settings for the printing press 10 which the control device is not able to automatically implement. To be able to effect these settings on its own, the control device has access to job data of all print jobs processed on the particular printing press 10. To this end, data relating to the print jobs may be stored in the control device itself, or the control device may have access, via a data link, to another computer or memory device, on which such job data are stored.

In one first advantageous embodiment of the present invention, the control device operates to direct a query to an operator of the machine when the data for processing the job do not suffice or cannot be completed by the control device, or when a plurality of equivalent alternatives is available. Thus, if the control device does not have sufficient data available to it for setting up and implementing the job on a machine and is also not able to compute these data on the basis of existing data or supplement these data with existing data, the processing of the print job may nevertheless be ensured by this embodiment of the present invention in that the control device seeks the missing data in a query directed to the operator. When querying the operator, the control device selectively determines which data are still missing. In the process, the control device signals the operator in detail as to which data the operator still needs to enter in order to continue with the setting up and processing of a print job. This well-directed querying substantially facilitates the operator's work in comparison to conventional machines, since the operator only needs to supplement a limited amount of data.

In accordance with the flow chart in FIG. 1, the automatic operation is implemented as a so-called operational control agent in the form of a software module in the control device, the operational control agent being able to be switched on and off. This means that, in the specific embodiment according to FIG. 1, operating personnel may decide themselves whether they prefer conventional operation using manual settings or automatic operation by the operational control agent. When the operational control agent is started, the settings of printing press 10, as well as the processing steps currently running on printing press 10 are analyzed, and the corresponding other steps are then lined up.

In FIG. 1, the operational control agent is switched on (100) at the very moment that a print job is being processed on printing press 10. In this state, based on the pending print jobs, the operational control agent first determines how much further a current print job still has to go (102). If the end of the job will be reached soon, depending on the printing press setting, "soon" possibly meaning that the current print job is 75% complete, the operational control agent automatically searches for a subsequent job (104). If the current job is not near the end, the computer 4 can first direct a query via operator's control screen 2 to the operator asking whether it should search for a subsequent job (106). If it is intended, at this point, to involve the operator in the process, then operator must initiate the search for the subsequent job by pressing a button on touch screen 2. In both cases, the operational control agent begins to search for subsequent jobs, these jobs possibly already being completely or partially stored in the internal data memory of computer 4. In addition, via a network, the control device may also request the data needed for the print job, which are available, for example, in CIP3 or CIP4 format, or prompt the operator to insert a data carrier, on which the necessary data are written, into computer 4. If no subsequent job is pending, a new electronic job docket is automatically generated, i.e., the data needed for a print job are requested.

In the search for a subsequent job (104), it is advantageously provided that, in the case of a plurality of stored jobs, the software module according to the present invention generates the sequence of the jobs in consideration of the outlay required to reset the machine between the individual jobs. For the most part, the machines in the graphics industry run in a shift operation and process several jobs each day. Between the individual jobs, the machines must be reset in accordance with the requirements of the jobs, since each print job places different demands on the machines involved. For the most part, the more the settings on the machines need to be changed between two print job orders, the longer the resetting operation takes. At this point, the control device may determine the actions necessary for the resetting operation by comparing the job data of the pending jobs. In this context, the control device sorts the pending jobs with a view to achieve the shortest possible resetting times among the individual jobs. In the process, the individual job order deadlines are, of course, also considered, when necessitated by time considerations. In addition, the outlay required for resetting the machines may serve as a criterion, since the resetting operation is generally personnel-intensive. Thus, depending on which criteria are stored in the control device, the order in which the stored jobs are processed on the machines is specified at the control device. The operator no longer needs to be overly preoccupied with these procedures.

Once the subsequent job is selected, the already supplied data for the selected job are retrieved from memory (108). It is also provided for the control device to store and retrieve machine settings used to execute the stored jobs. In this way, these settings may be reused for future jobs. Since, when working with permanently stored machine settings, a great many settings are modified in the course of the job, it is practical to implement the data pertaining to the settings and adjustment data at specific time intervals, e.g., at the beginning of the job, in the middle, and at the end. In addition, following each job order, a query is directed to the operator as to whether the data should actually be stored or whether they should be discarded.

Moreover, it is advantageously provided for the control device to compare the pending, stored jobs with data from jobs processed in the past and, when it is determined that the job properties match, for the stored machine settings used at the time these jobs were processed to be used. Every machine and printing presses, in particular, exhibit recurring deviations in the actual values from the set point values because of manufacturing tolerances and tolerances inherent in the consumables when printing jobs are processed. At this point, given the same or similar stored print jobs, the control device may draw upon deviations that occurred and were logged in the past in order, right from the outset, to take account of past deviations and, thus, in the course of the printing operation, anticipate the necessary corrections.

If, for example, when working with a specific printing ink and a specific printing substrate used in the past, it had always been necessary to correct characteristics of the inking system in question by a specific value, then in the case that this printing ink and this printing substrate are used again in another job, the control device will include precisely these deviations in the calculations and automatically correct them. For that reason, the operator does not need to draw on his or her experiences from previous print jobs. This substantially facilitates the operation for operating personnel having little knowledge of printing technology.

As noted, in the process, the operator is made aware of incomplete or implausible data, to the extent possible, the operational control agent automatically computing the correct or missing data, using the control device. Another advantage is derived in that the control device checks the properties included in the job order for plausibility, and implausible properties are either replaced by plausible ones, or a query is directed to the operator, as will be described.

It is a frequent occurrence when working with print jobs, that one property of the print-job data record is out of line, for example the property is unusual or does not fit in with the job. It is often a case of an erroneous input by an operator in the long chain of job order preparation. When, based on other existing data, it is clearly recognized that this individual erroneous property is incorrect, the control device, on its own, computes the correct property from the other existing data and continues with the setting up and processing of the print job. However, if the correct property is not clearly ascertainable from the other data, the control device automatically computes possible correct properties (110) and directs a query to the operator. In this case, the operator must then decide how the erroneous property should be corrected.

An example of this is an unusual print format in the job docket, which does not conform with the customary print formats. When the format width does not match the customary formats, for example, this is signaled to the operator who must then enter the correct format on his own.

When all necessary data are available (112), there is no need for a query to the operator. However, if relevant data are still missing (112), then these data are requested. In this case, a query is made in dependence upon context, i.e., only the necessary data are acquired, and, for the most part, the operator is already offered a setting which results as the most likely solution from empirical values or from other past preferences (114). The operator only needs to then confirm or reject the answer offered to the operator (116). In the case that the operator rejects the answer, then, if the operator has the appropriate authorization based on the operator's authorization profile, the operator may modify this setting and also enter the data. The selection options are preferably presented using natural methods of communication, i.e., images, animated graphics and text are displayed, these outputs on screen 2 also being supportable by a voice output. In this context, the operator input may be carried out via the touch screen of operator's control screen 2 or via separate input devices, such as mouse, keyboard, or by way of a visual recognition of gestures by video camera 1 or by way of a voice recognition. Upon completion of a query (114, 116), the computer 4 then again determines if all data are present (112).

According to a feature of the present invention, the screen readout has the advantage that the operator is offered guidance in the decision making process, in a visual form. Thus, for example, given a plurality of alternatives, a plurality of buttons is displayed on a screen for the operator to use to define further selection criteria. When, after selecting the further criteria, only one alternative still remains, the control device automatically continues with the set-up or processing operation. Moreover, when it comes to selecting the characteristics, a set of characteristics may be indicated to the operator on the screen, so that the operator has a better idea of the data to be input. The voice output is advantageous when the query involves a decision that simply requires a yes or no response. In this case, there is no complicated factual situation that needs to be visually displayed, so that there is no need to output the query on the screen. Of course, voice output and visual display prompts may also be combined, the voice output naturally not being limited to simple yes/no queries. The noisy ambient environment of printing presses makes it preferable for the operator to use headphones when conversing with the voice control. These are ideally linked via a wireless connection to the control device. This enables the operator to also respond to simple queries when the screen is out of reach.

When all query dialogs (114, 116) have been completed (yes to the "all data present decision block (112)), the acquired data are stored in the control device (118). At this point, from these acquired job data, the operational control agent now automatically determines the requisite machine settings for the now pending subsequent job (120). In the interim, the still running print job is then processed, so that appropriate resetting operations must be undertaken at printing press 10 for the next pending print job. By comparing the settings of printing press 10 required for the still running print job with the settings required for the subsequent job computed from the job data, the control device is able to compute the necessary resetting operations. In the process, the resetting operations to be carried out are optimized to keep the requirements for the manual job to a minimum, and, at the same time, the time needed for the resetting operations as short as possible (122). In addition, manual activities, that the operator may perform already during the still running print job, are suggested to the operator (124), thereby further shortening the resetting time between the two jobs.

A shift schedule for the operating personnel is advantageously stored in the computer, on whose basis the control device starts up the machine or shuts it down, or triggers other functions. A certain amount of time is always needed for the start-up and initial operation of printing presses, since certain basic adjustments must be made during this operation, which are also dependent on the ambient temperature and air humidity. This embodiment of the present invention not only enables the machines to make the basic adjustments themselves, so that they are in a state of operational readiness when the operating personnel start their shift, but also, when the machines are powered up, enables the next job to be processed to be considered at the same time. Also, to the extent permitted under safety considerations, the machines are first started up already before the shift begins, thereby enabling the working hours of the operating personnel to be optimally utilized for the processing of print jobs. However, even when it is only permissible for the machines to be started up under the supervision of the operating personnel, an automatic initial start-up is beneficial for the operating personnel, since it enables them to perform other tasks during the start-up operation and eliminates the need for them to make necessary adjustments at the machines themselves, manually.

At a decision block, it is determined whether the current job has finished (126). If not, the software module returns to step 124. As soon as the still running print job is completely finished, the operational control agent initiates the now necessary resetting operations (128), either automatically or in response to receipt of a confirmation signal from the operator who has input the same via touch screen 2. At this point, the control device carries out the necessary resetting operations, in the case of resetting operations which are only able to be performed manually by the operator, the operator being prompted to do so acoustically via voice output or visually via operator's touch screen 2. At the same time, this prompt may be accompanied by assistance in the form of instructions for further actions to be performed by the operator.

However, the operational control agent may not only be used for the job order change described exemplarily, but for all adjustment processes taking place at a printing press 10. By using the operational control agent according to the present invention, operator interventions are limited to the extent that is absolutely necessary, and the operator's work is substantially facilitated.

In addition, it may advantageously be provided for the control device to determine the necessary resetting operations between two jobs on the basis of the jobs involved, and to automatically carry out these resetting operations. Since the control device has already computed the resetting operations in order to determine the sequence of the print jobs, it may also undertake these resetting operations in a self-acting and automatic manner. In this case, for example, the plate change is carried out automatically, and the inking system is prepared in accordance with the next print job, etc.

A further benefit is derived in that the control device communicates to the operator the necessary manual interventions for the operator to carry out during the resetting operations, and does not continue with the automatic resetting operations until it has recognized that the operator has performed the manual operations, and/or until this has been expressly confirmed beforehand by an acknowledgment signal from the operator. For the most part, it is not possible to eliminate the need for the operator to manually intervene in the resetting operations between two print jobs. For example, when there is no automatic plate changer at the print units of an offset sheet-fed press, then the operator must change the printing plates. In such a case, the control device prompts the operator at the right moment to remove a printing plate from the plate cylinder of the printing press and to insert a new printing plate. When this action is complete, there are two options for continuing. Either the machine automatically recognizes, via built-in sensors, that the new printing plate has been correctly clamped and communicates this to the control device, in response to which, the control device automatically continues with the resetting operations, or the operator acknowledges at the screen of the control device or by voice command that the new printing plate has been correctly clamped, in response to which, the control device then likewise continues with the resetting operations. Thus, this embodiment of the present invention reduces manual interventions by the operator to a necessary minimum and, at the same time, ensures that the manual interventions are carried out correctly.

Another embodiment of the present invention is distinguished in that the control device signals a warning to the operator when certain machine parameters are outside of the tolerances stored on the computer. In this manner, there is no need for the operator of a printing press to first wait for the first specimen prints, to then ascertain that the values lie outside of the tolerances, rather, the operator is immediately informed, acoustically and/or visually, by the control device that certain values are outside of the designated tolerances. In the process, the control device may additionally propose changes in machine settings to the operator that will restore the exceeded tolerances to the normal measure. If the exceeding of tolerances is only short-lived, then the operator may also ignore the warning message and allow the machine to continue to work without interruption.

The aforementioned method may be advantageously improved in that the control device stores the setting that was modified by the operator to remedy the exceeding of tolerance limits and then automatically uses this modified setting accordingly in response to a repeated exceeding of tolerance limits. If, on the basis of the job data, the consumables, and other properties, the control device ascertains a similarity between the current printing process and earlier printing processes, it may then itself correct typical occurrences of the tolerance limits being exceeded, by accessing correction values previously input by the operator. In this manner, the operator may devise remedial scenarios for the repeated occurrence of a specific exceeding of tolerance limits, so that, in response to the occurrence of the same occurrence there is no need to repeat the interventions. Since the number of scenarios stored in the control device increases with machine time, the need for the operator to modify settings becomes less over time. Thus, in this manner as well, operator interventions are reduced even further.

It is additionally provided that, on the basis of the logged data of the performed jobs, the control device optimizes characteristics or proposes the optimization of characteristics to the operator. This embodiment of the present invention closely relates to correcting the exceeding of tolerance limits. However, the exceeding of tolerance limits is rather a question of individual values, while characteristics concern an entire curve of values, and the adaptation of characteristics is not necessarily accompanied by a previous exceeding of tolerance limits. Thus, it may be the case that an operator corrects the characteristic of an inking system on a regular basis when the operator is printing at the machine, which is then noticed by the control device, so that, in response to repeated operation of the printing press by this operator, the characteristics preferred by this operator are selected. At the same time, the control device may offer the operator the option of taking over characteristics from similar print jobs that other printers use at the same machine, thereby enabling the operator to benefit from the experiences of other operators, as well.

A further advantage is derived in that, on the basis of the data of the performed jobs, the control device identifies the necessary maintenance measures and automatically implements them. Every print job places demands on a machine because of different print volumes, different printing inks, and other such differences, so that the wear and tear and resultant maintenance measures are dependent on the print jobs executed on the machine. By logging the print jobs as well, the control device is able to automatically recognize the necessity of maintenance measures and also automatically implement the same, e.g., during a job change-over. Should operator assistance become necessary during maintenance procedures, the operator is acoustically and/or visually prompted by the control device to make the necessary interventions. Here as well, performance of maintenance work to be carried out by the operator may either by detected by sensors of the machine or confirmed by an acknowledgment signal from the operator via voice input or at the screen.

A further advantage is derived in that, prior to reaching the end of the job, the control device initiates an ink profile shut-off or removal in at least one inking system of a printing press. Since an inking system must be individually configured for each job, it is a considerable advantage when the ink profile shut-off is executed in a timely manner to enable the subsequent job to be immediately processed, without the need for an additional ink profile shut-off. However, since printing substrates are necessarily used up during the ink profile shut-off, the control device is advantageously designed to only execute the ink profile shut-off when the operator confirms this and/or when the control device executes the ink profile shut-off on its own, and does so only after comparing the costs of the printing substrates of the job in progress and of the subsequent job. In the case that the subsequent job uses less expensive printing substrates, then the ink profile shut-off is not carried out until the subsequent job, which uses these less expensive printing substrates, is processed, unless the operator changes the sequence via an input into the operation of the control device.

The present invention may be applied quite advantageously to machines in the graphics industry, such as printing presses, pre-press devices, or post press machines, since, increasingly, the personnel engaged at these machines are not adequately skilled in printing technology. Therefore, comprehensive assistance is required from the machines themselves.

For that reason, it is also a considerable advantage that, in another embodiment of the present invention, the type of output is dependent on the data pertaining to the particular operator which are stored in the computer. When the control device knows that a particular operator has many years of experience working with printing presses, then it will formulate queries directed to the operator differently than to an operator whose access rights to the settings of the printing press are very limited from the outset, due to his lack of experience. In this manner, the experienced operator is given more opportunities to modify the settings of a machine than is an inexperienced operator. The data pertaining to the operator must, of course, be previously known to the computer, i.e., to the control device. This may be accomplished by a one time log-in procedure, in which the operator in question enters his qualifications and skills. When the operator in question then logs in again at the machine, the operator is automatically recognized, and the queries output to the particular operator are adapted to conform with the stored qualifications and skills, and access profile. At the same time, the operator's inputs may be included with the logged data, and the stored qualifications and skills of the operator are adapted in this way. If it is determined that the operator is making frequent false inputs, which, for example, lead to a machine stoppage, then the access rights of this particular operator are restricted.

It is also provided for production paths to be computed by the control device on the basis of the job data and the machinery available in a printing plant and, in the event of alternative production paths, for the operator to have the option of selecting an alternative. Depending on the available machines in a printing plant, for the most part, there is a plurality of production paths for each printed product. Normally, it is the operator who, on the basis of the job data, must generate the production paths to be considered and then select the corresponding machines capable of processing the job. In this case, the operator is relieved of these tasks by the control device, which, on the basis of the job data and the available machinery, computes all of the possible production paths in the printing plant and then, given equivalent alternatives, leaves the selection to the operator. The costs that arise or the job order deadlines may also be considered in the computation of the production paths. Thus, during the production planning, there is no need for the operator to enter any data, rather, the operator may conveniently select among alternatives offered to the operator. If there are no alternatives, then there is no need at all for the operator to intervene; instead the job is directly processed on the basis of the computed production path.

REFERENCE SYMBOL LIST 1 video camera
2 operator's control screen
3 hinge-mounted bracket
4 computer
5 lighting
6 control console
7 communications connection
8 identification sensor
10 printing press
11 print unit 12 inking system
13 printing and transport cylinders

What is claimed is:

1. A method for operating a graphics machine using a computer, comprising the steps of:
   storing data relating to at least one graphic job;
   operating the computer as a control device to setup the graphics machine, the graphics machine being a printing press, as a function of the data relating to the at least one graphic job;
   further operating the computer as the control device to determine properties of the at least one graphic job, as a function of the data relating to the at least one graphic job, for control of the graphics machine;
   computing further data necessary to process the at least one graphic job as a function of the data relating to the at least one graphic job and subsequently automatically processing the at least one graphic job; and
   operating the computer as the control device to determine resetting operations between the at least one graphic job and a subsequent graphic job while the at least one graphic job is still being processed by comparing the settings of the printing press required for the still running print job with the settings required for the subsequent graphic job computed from the job data and automatically controlling the determined resetting operations for the subsequent graphic job.

2. The method of claim 1 comprising the further step of operating the control device to direct a query to an operator of the graphics machine when the data relating to the at least one graphic job indicates a plurality of alternatives is available.

3. The method of claim 2 wherein the query to an operator of the graphics machine comprises a screen readout.

4. The method of claim 2 wherein the query to an operator of the graphics machine comprises a voice output.

5. The method of claim 1 comprising the further step of operating the control device to compute production paths as a function of the data relating to the at least one graphic job and machinery available in a printing plant.

6. The method of claim 5 wherein upon computation of alternative production paths, operating the control device to give an operator an option of selecting one alternative of the computed alternative production paths.

7. The method of claim 1 wherein the data relating to at least one graphic job comprises data relating to a plurality of stored jobs, and comprising the further step of operating the control device to generate a sequence of graphic jobs as a function of an outlay required to reset the graphics machine between individual jobs.

8. The method of claim 1 wherein a shift schedule of operating personnel is stored, and comprising the further step of operating the control device to control the graphics machine as a function of the shift schedule.

9. The method of claim 1 comprising the further step of operating the control device to check the determined properties for plausibility.

10. The method of claim 1 wherein the control device operates to store settings of the graphics machine used for processing the at least one graphic job.

11. The method of claim 10 comprising the further step of operating the control device to compare the at least one graphic job, and the stored settings for previous ones of the graphic jobs, to determine property matches, and to use the determined property matches to setup, control and operate the graphics machine.

12. The method of claim 10 comprising the further step of operating the control device to determine optimized characteristics for the at least one graphic job as a function of the stored settings for previous ones of the graphic jobs.

13. The method of claim 10 comprising the further step of operating the control device to determine maintenance measures for the graphics machine as a function of the stored settings for previous ones of the graphic jobs.

14. The method of claim 1 comprising the further step of operating the control device to communicate to an operator of the graphics machine manual interventions for the operator to carry out during a resetting operation.

15. The method of claim 14 wherein the control device operates to recognize that the operator has performed the manual intervention and refrains from continued operation until recognition of completion of the manual intervention.

16. The method of claim 1 comprising the further step of operating the control device to signal a warning to an operator of the graphics machine when preselected parameters of the graphics machine are exceeded.

17. The method of claim 16 wherein the control device stores settings modified by the operator in response to the signal to remedy an exceeding of preselected parameters and automatically uses the modified settings in a repeated exceeding of the preselected parameters.

18. The method of claim 1 comprising the further step of operating the control device to initiate an ink profile shut-off.

19. A computer system for operating a graphics machine, comprising:
   a computer coupled to the graphics machine; and
   a memory storing data relating to at least one graphic job, to be processed on the graphics machine;
   the computer being arranged and configured to:
   operate as a control device to setup the graphics machine, the graphics machine being a printing press, as a function of the data relating to the at least one graphic job;
      further operate as the control device to determine properties of the at least one graphic job, as a function of the data relating to the at least one graphic job, for control of the graphics machine;
      compute further data necessary to process the at least one graphic job as a function of the data relating to the at least one graphic job and subsequently automatically process the at least one graphic job; and
      operate as the control device to determine resetting operations between at least one graphic job and a subsequent graphic job while the at least one graphic job is still being processed by comparing the settings of the printing press required for the still running print job with the settings required for the subsequent graphic job computed from the job data and automatically control the determined resetting operations for the subsequent graphic job.

20. The computer system of claim 19 wherein the graphics machine comprises a printing machine.

21. The computer system of claim 19 wherein the graphics machine comprises a pre-press device.

22. The computer system of claim 19 wherein the graphics machine comprises a post press machine.

23. The computer system of claim 19 further comprising a screen output device, the computer being further arranged and configured to direct a query to an operator of the graphics machine as a screen readout.

24. The computer system of claim 19 further comprising a voice output device, the computer being further arranged and configured to direct a query to an operator of the graphics machine as a voice output.

* * * * *